United States Patent
An

(10) Patent No.: US 9,132,822 B2
(45) Date of Patent: Sep. 15, 2015

(54) DEVICE AND METHOD FOR CONTROLLING CLUTCH OF HYBRID VEHICLE

(71) Applicant: Hyundai Motor Company, Seoul (KR)

(72) Inventor: Jung Un An, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 49 days.

(21) Appl. No.: 14/133,301

(22) Filed: Dec. 18, 2013

(65) Prior Publication Data

US 2015/0065295 A1   Mar. 5, 2015

(30) Foreign Application Priority Data

Aug. 29, 2013   (KR) .......................... 10-2013-0103131

(51) Int. Cl.
*B60W 10/02*   (2006.01)
*B60W 20/00*   (2006.01)

(52) U.S. Cl.
CPC ............... *B60W 10/02* (2013.01); *B60W 20/10* (2013.01); *Y10S 903/902* (2013.01)

(58) Field of Classification Search
CPC .............................. B60W 10/02; B60W 20/10
See application file for complete search history.

(56) References Cited

U.S. PATENT DOCUMENTS

| 2003/0109359 | A1* | 6/2003 | Eguchi et al. ................. 477/174 |
| 2013/0317687 | A1* | 11/2013 | Ito et al. ........................... 701/22 |
| 2014/0019021 | A1* | 1/2014 | Yanagida et al. ............... 701/54 |
| 2014/0202423 | A1* | 7/2014 | Carvignese et al. .......... 123/321 |
| 2014/0277890 | A1* | 9/2014 | Ideshio et al. .................. 701/22 |

FOREIGN PATENT DOCUMENTS

| JP | 2003-161181 A | 6/2003 |
| JP | 2007-083796 A | 4/2007 |
| KR | 10-2007-0062425 A | 6/2007 |

* cited by examiner

*Primary Examiner* — Tisha Lewis
(74) *Attorney, Agent, or Firm* — McDermott Will & Emery LLP

(57) ABSTRACT

A device and method for controlling a clutch of a hybrid vehicle controls an engagement and a disengagement of an engine clutch installed between an engine and a motor. The device includes a acceleration request sensor for sensing driving situations in which acceleration is needed immediately after deceleration of the hybrid vehicle in a state where the engine clutch is engaged. A controller maintains the engagement state of the engine clutch even though a disengagement condition of the engine clutch is satisfied when receiving a sensed signal of the acceleration request sensor.

6 Claims, 5 Drawing Sheets

DEVICE AND METHOD FOR CONTROLLING CLUTCH OF HYBRID VEHICLE

CROSS-REFERENCE TO RELATED APPLICATION

This application claims under 35 U.S.C. §119(a) the benefit of priority to Korean Patent Application No. 10-2013-0103131 filed Aug. 29, 2013, the entire contents of which are incorporated herein by reference.

TECHNICAL FIELD

The present disclosure relates to a device and method for controlling a clutch of a hybrid vehicle. More particularly, it relates to a device and method for controlling a clutch of a hybrid vehicle, which can improve the driving performance by preventing the disengagement of the engine clutch in a situation where acceleration is needed immediately after deceleration of the vehicle.

BACKGROUND

Recently, eco-friendly vehicles such as electric vehicles, hybrid and plug-in hybrid vehicles, and fuel cell vehicles have been mass-produced in order to improve the fuel efficiency in view of high oil prices and meet regulations on carbon dioxide emissions.

The hybrid vehicles among the above-mentioned eco-friendly vehicles can reduce exhaust gas and improve the fuel efficiency by selecting a motor and an engine as a power source. The hybrid vehicles require a high efficiency and performance power transmission system which transmits the engine power or the motor power separately or simultaneously to the drive wheels.

As shown in FIG. 1, a typical powertrain for a hybrid vehicle includes an engine 10 and a motor 12 that are directly connected to each other, and a clutch 13 that is disposed between the engine 10 and the motor 12 to transmit or interrupt the engine power. A controller 15 controls the clutch engagement and disengagement according to a driving situation. An automatic transmission 14 changes a speed of the power to output the power to a drive wheel, and an integrated starter generator (ISG) 16 is connected to a crank pulley of the engine to start the engine and generate electricity.

The engine clutch may be mounted between the engine and the motor instead of a torque converter to reduce the manufacturing cost of the hybrid vehicle and minimize a loss of the torque delivered to the transmission. Thus, the engine clutch may control the output torque of the engine.

Driving modes of the hybrid vehicles having the powertrain include an electric vehicle (EV) mode, i.e., a pure electric vehicle mode that uses the motor power only, and a hybrid electric vehicle (HEV) mode that uses the engine as a main power source and the motor as an auxiliary power source. The regenerative braking (RB) mode recovers vehicle braking or the inertial energy through the electricity generated in the motor during the vehicle braking or the inertia from driving the vehicle and charges the battery.

The HEV refers to a mode in which a vehicle is driven by the sum of the output torque of the engine and the motor when a main relay, which supplies power to the motor, turns on as the engine clutch is engaged during the driving situations, such as, start, acceleration, and climbing, that applies a great load to the engine.

In the EV mode, in which only the motor is driven, the engine clutch is disengaged, and the main relay turns on, thereby allowing the vehicle to run only by the output torque of the motor.

When the EV mode shifts to the HEV mode, the engine clutch is engaged. For example, the output speed of the engine and the speed of the motor are synchronized together with cranking of the ISG, and then, the engine clutch is engaged to shift the driving mode to the HEV mode.

In this case, when the EV mode (engine clutch disengaged) shifts to the HEV mode, a certain amount of time is consumed for the engagement of the engine clutch to shift to the HEV mode.

Accordingly, when the EV mode shifts to the HEV mode through the engagement of the engine clutch and the transmission to the lower gear, the acceleration performance at kickdown to accelerate the vehicle may largely depend on the response speed and the response performance of the engine clutch.

On the other hand, when the HEV mode shifts to the EV mode, the engine clutch is disengaged, and an entry condition for the disengagement of the engine clutch is as follows.

1) A case where the entry condition is satisfied by the ISG torque (ISG Tq)
2) A case where the entry condition is satisfied by an engine torque (engine Tq)
3) A case where the entry condition is satisfied by a vehicle speed and a gear shift
4) A case where the RPM of the motor satisfies the entry condition by the vehicle speed and a break depth
5) A case where the entry condition is satisfied by a shift phase of a transmission control unit (TCU) according to the vehicle speed, the gear shift, and the break depth.

Based on the foregoing entry conditions, FIG. 2 shows an engine clutch engagement condition.

In case of 1) or 3), when the ISG torque is equal to or smaller than table values by the current vehicle speed and the gear shift, the engine clutch disengagement condition is satisfied by the amount of torque.

In case of 1) or 3), when the engine output torque is equal to or smaller than table values by the current vehicle speed and the gear shift, the engine clutch disengagement condition is satisfied by the amount of torque.

When the foregoing two conditions are simultaneously satisfied, a time delay may occur according to the table values by the vehicle speed and the gear shift, and the engine clutch disengagement condition is satisfied.

In case of 4), when the RPM of the motor is smaller than the current vehicle speed and the brake depth, the engine clutch disengagement condition by the speed is satisfied.

In case of 5), when the vehicle speed is smaller than set values for each gear stage, and a brake switch is in an on-state, the engine clutch disengagement condition is determined by the shift phase of the TCU. Also, when the vehicle speed is greater than the set values for each gear stage or the brake switch is in an off-state, the engine clutch engagement condition is satisfied even when the shift phase of the TCU is not under shifting gear before stopping.

Thus, the clutch disengagement by torque is determined by input factors such as the engine torque, the ISG torque, the vehicle speed, and the gear shift, or the clutch disengagement by speed is determined by input factors such as an RPM of motor, the vehicle speed, and the brake depth. Also, the clutch disengagement is determined by the shift phase of the TCU.

When a driver decelerates a vehicle to change lanes, overtake other vehicles, or turn left or right at an intersection, the engine clutch disengagement condition is satisfied, allowing the engine clutch to be disengaged.

That is, during the HEV mode, when the driver confronts a situation where the vehicle needs to accelerate immediately after deceleration, such as changing lanes, overtaking other vehicles, turning left or right at an intersection, the driver usually decelerates the vehicle for safety. When the above-mentioned engine clutch disengagement entry condition is satisfied, the engine clutch is disengaged.

When the engine clutch is disengaged immediately after the deceleration in the HEV mode, the vehicle shifts to the EV mode. In this case, when a vehicle needs to accelerate, the engine clutch needs to be engaged, affecting the operability and accelerating performance of the vehicle.

As a result, when acceleration of a vehicle is needed immediately after deceleration, the engine clutch needs to be re-engaged for the EV kickdown operation for shifting from the EV mode to the HEV mode. In this case, since a period of time (about 1.1 seconds) is needed for re-engagement of the engine clutch, the operability and the accelerating performance of the vehicle may be affected, and the fuel efficiency may be reduced.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure provides a device and method for controlling a clutch of a hybrid vehicle, which can improve the operability and the accelerating performance of a vehicle according to a disengagement and a re-engagement of an engine clutch, by maintaining the engagement of the engine clutch in a situation where a hybrid vehicle needs to accelerate immediately after deceleration of the hybrid vehicle.

According to an exemplary embodiment of the present disclosure, a device for controlling a clutch of a hybrid vehicle controls an engagement and a disengagement of an engine clutch installed between an engine and a motor. The device includes an acceleration request sensor for sensing driving situations in which acceleration is needed immediately after deceleration of the hybrid vehicle in a state where the engine clutch is engaged. A controller maintains the engagement state of the engine clutch even though a disengagement condition of the engine clutch is satisfied when receiving a sensed signal of the acceleration request sensor.

The acceleration request sensor may use switches of left and right turn signal lamps.

A controller area network (CAN) signal, in a case where a turn-on signal of the switch is transmitted to a cluster, may also be transmitted to the controller.

According to another exemplary embodiment of the present disclosure, a method for controlling a clutch of a hybrid vehicle performs an engagement and a disengagement of an engine clutch installed between an engine and a motor. The method includes sensing driving situations in which acceleration is needed immediately after deceleration of the hybrid vehicle in a state where the engine clutch is engaged. The engagement state of the engine clutch is maintained even though a disengagement condition of the engine clutch is satisfied when the driving situation in which acceleration is needed is sensed.

The sensing of the driving situations in which acceleration is needed may include sensing a turn-on signal of a switch of a left or right turn signal lamp.

The sensing of the driving situations in which acceleration is needed may include sensing a signal when the turn-on signal of the switch of the left or right turn signal lamp is transmitted to a cluster.

Other aspects and exemplary embodiments of the disclosure are discussed hereinafter.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
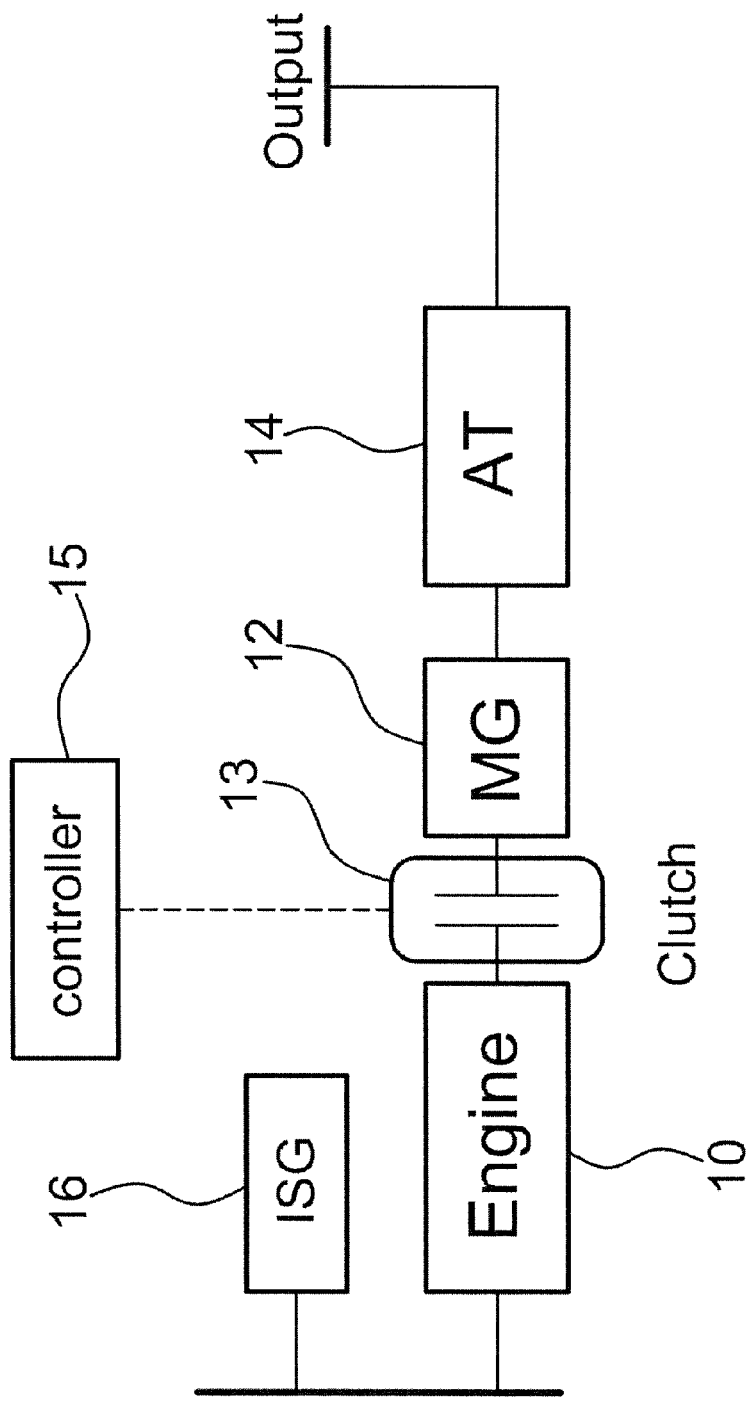
FIG. 1 is a view illustrating a power transmission system for a hybrid vehicle according to the related art.
Figure 2:
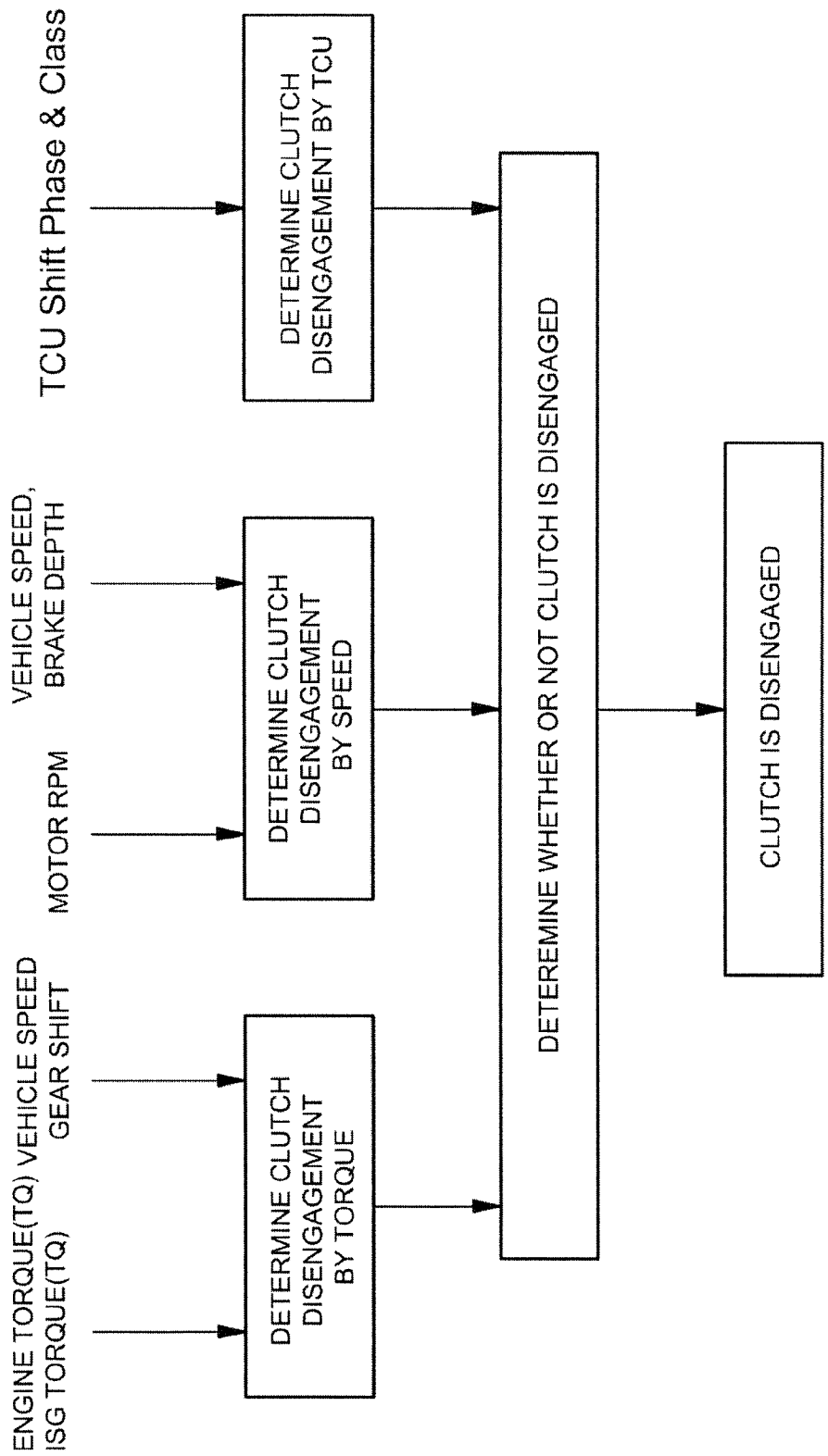
FIG. 2 is a control flow view illustrating a typical method for controlling a clutch of a hybrid vehicle according to the related art.

It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

Hereinafter, exemplary embodiments of the present disclosure will be described in detail with reference to the accompanying drawings.

When a hybrid vehicle runs in a hybrid mode in which an engine and a motor are used together as power sources in a state where an engine clutch is engaged, when the vehicle confronts driving situations, such as, changing lanes, overtaking other vehicles, and turning left or right at an intersection, that need acceleration immediately after deceleration, the disengagement condition of the engine clutch according to the deceleration of the vehicle may be satisfied, thus disengaging the engine clutch.

In the above-mentioned situation, since the engine clutch is disengaged, the engine clutch may be engaged upon acceleration, and may enter kickdown, consuming a gear-shifting time of about 1.1 seconds, and thus, reducing the accelerating performance in the situation where acceleration is needed immediately after deceleration. Also, due to an excessive repetition of the engagement and disengagement of the engine clutch, the fuel efficiency may be reduced.

In order to overcome the above limitations, the present disclosure provides a device and method for controlling a clutch of a hybrid vehicle, which can prevent the operability and the accelerating performance of a vehicle from being reduced according to the disengagement and re-engagement of an engine clutch, by maintaining the engagement of the engine clutch in a situation where a hybrid vehicle needs to accelerate immediately after deceleration of the hybrid vehicle.

Figure 3:
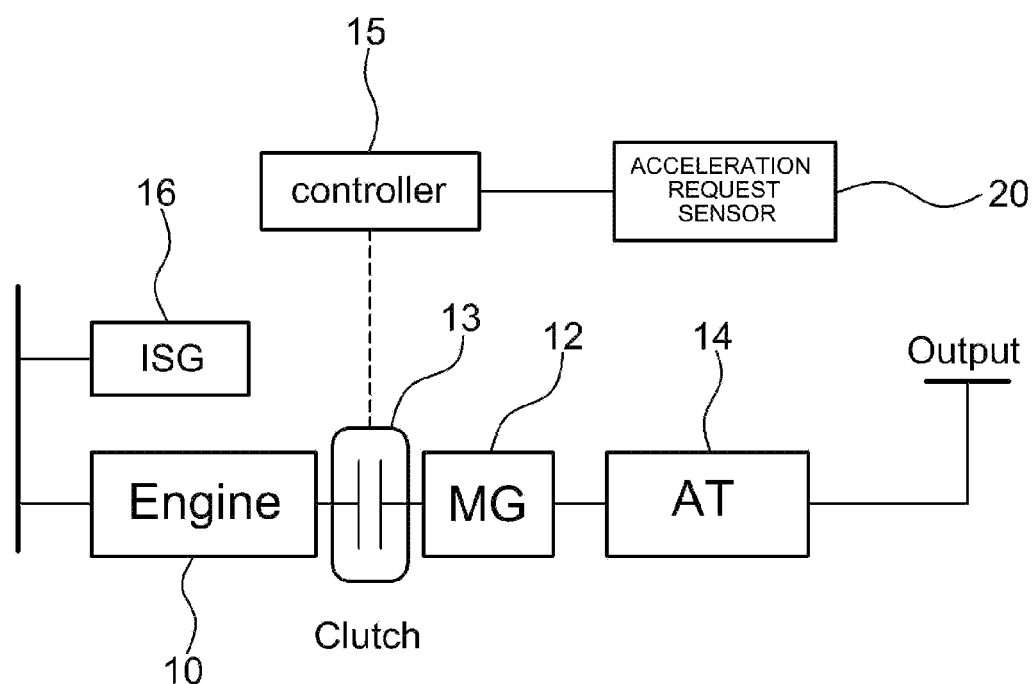
FIG. 3 is a view illustrating a device for controlling a clutch of a hybrid vehicle according to an embodiment of the present disclosure.

As shown in FIG. 3, the clutch control device may include a acceleration request sensor 20 and a controller 15. The acceleration request sensor 20 may sense a driving situation where acceleration is needed immediately after deceleration during the driving of a hybrid vehicle in a state where an engine clutch 13 is engaged. The controller 15 may maintain the engagement state of the engine clutch 13 when receiving a sensed signal of the acceleration request sensor 20.

The controller 15 may control the engagement or disengagement of the engine clutch, and when receiving the sensed signal from the acceleration request sensor 20, the controller 15 may maintain the engagement state of the engine clutch even though a disengagement condition of the engine clutch is satisfied.

The acceleration request sensor 20 may adopt switches for left and right turn signal lamps, which are lighted when a vehicle changes lanes, overtakes other vehicles, and turns left or right at an intersection.

When a controller area network (CAN) communication signal, in a case where the left or right turn signal lamp is switched on, is transmitted to a cluster, the CAN communication signal may also be transmitted to the controller 15 to recognize that acceleration is needed after deceleration.

Hereinafter, a clutch control method according to an embodiment of the present disclosure will be described in detail with reference to FIGS. 4 and 5.

In a state where the engine clutch 13 is engaged, when a hybrid vehicle shifts an HEV mode that uses the power of the engine and the motor to an EV mode, disengagement entry conditions of the engine clutch may be as follows.

1) A case where the entry condition is satisfied by an ISG torque (ISG Tq)
2) A case where the entry condition is satisfied by an engine torque (engine Tq)
3) A case where the entry condition is satisfied by a vehicle speed and a gear shift
4) A case where the RPM of the motor satisfies the entry condition by the vehicle speed and a break depth
5) A case where the entry condition is satisfied by the shift phase of a transmission control unit (TCU) according to the vehicle speed, the gear shift, and the break depth.

Figure 4:
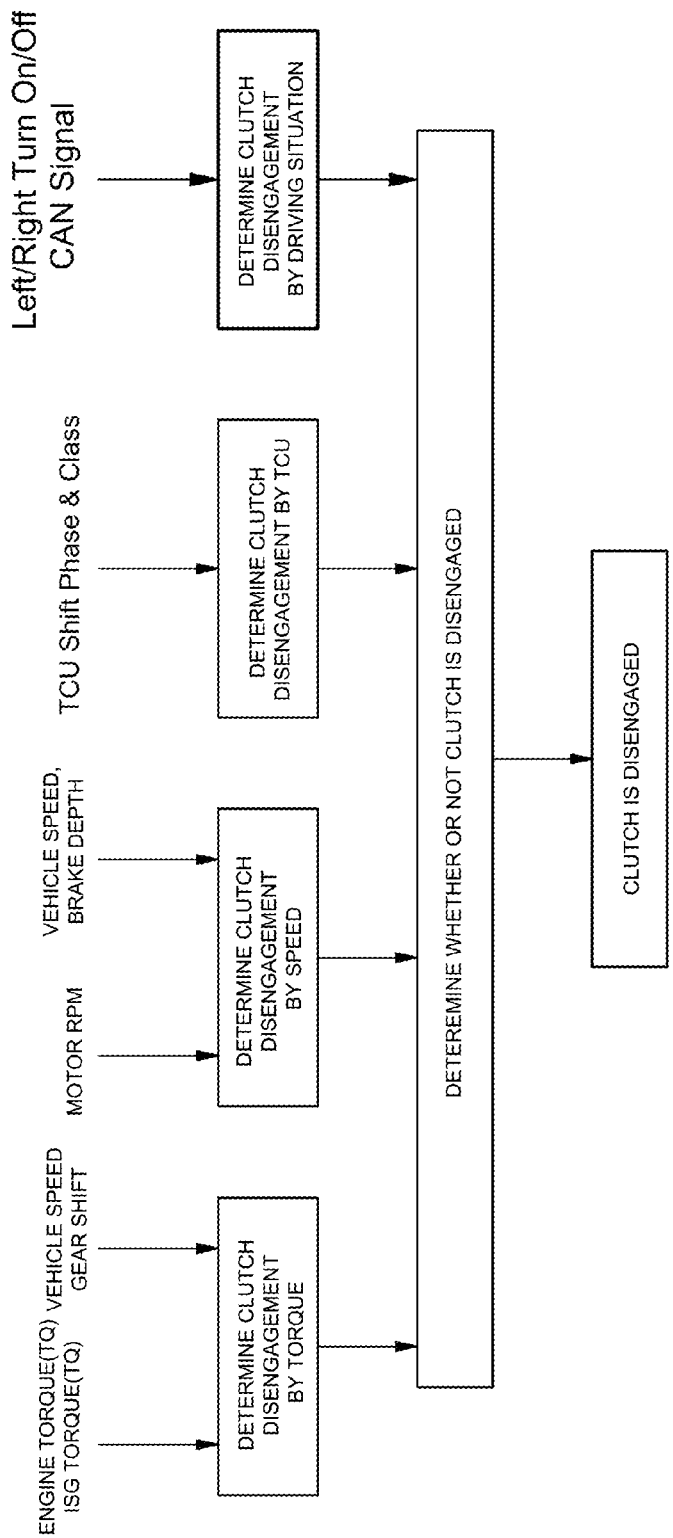
FIG. 4 is a control flow view illustrating a method for controlling a clutch of a hybrid vehicle according to an embodiment of the present disclosure.
Figure 5:
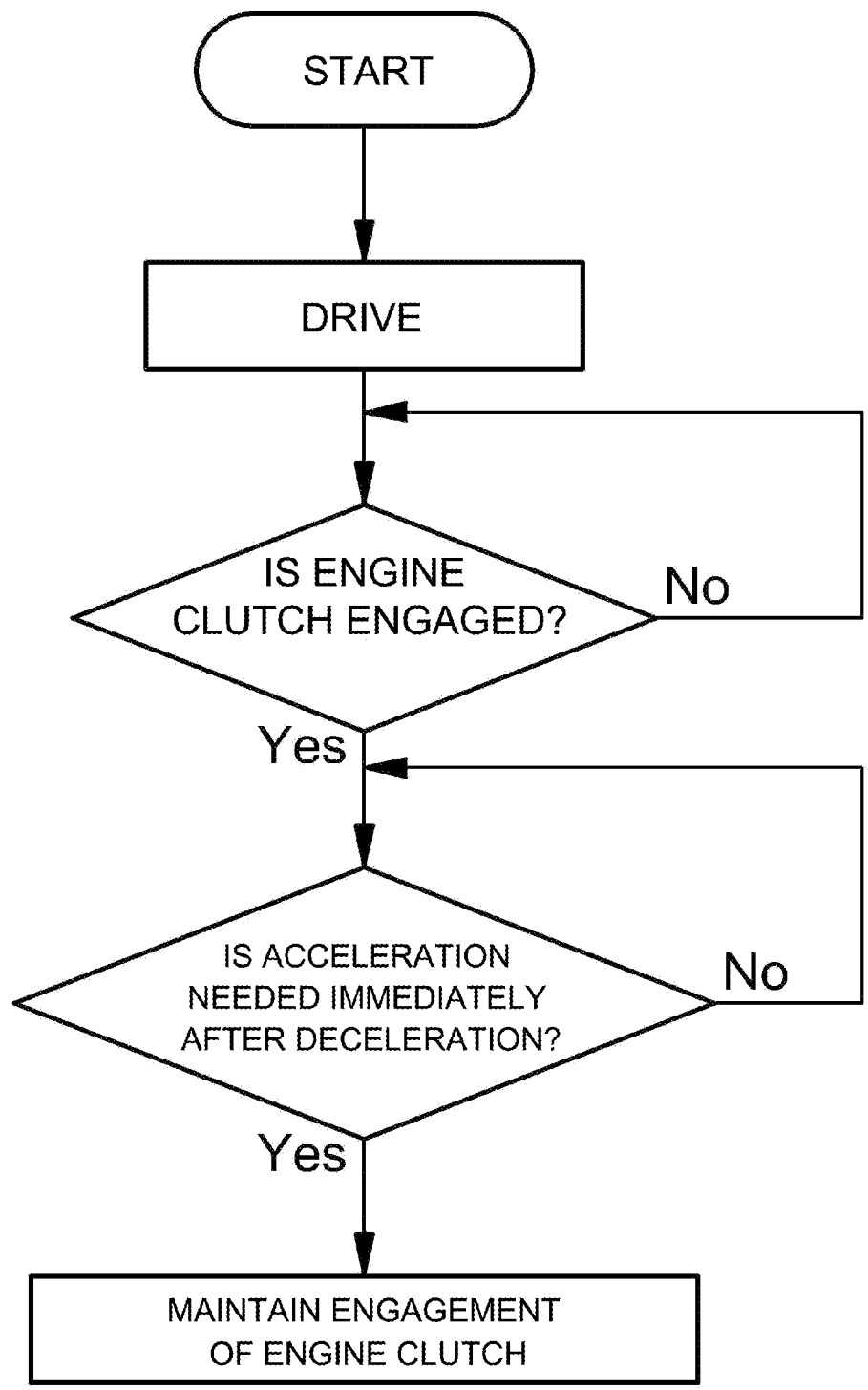
FIG. 5 is a flowchart illustrating a method for controlling a clutch of a hybrid vehicle according to an embodiment of the present disclosure.

As shown in FIG. 4, the clutch disengagement by torque is determined by input factors, such as an engine torque, an ISG torque, a vehicle speed, and a gear shift, or the clutch disengagement by speed is determined by input factors such as an RPM of motor, a vehicle speed, and a brake depth. Also, the clutch disengagement is determined by the shift phase of the TCU.

Unlike the engine clutch disengagement entry condition, in a state where the engine clutch 13 is engaged, when the hybrid vehicle runs in the HEV mode that uses the power of the engine and the motor and senses a driving situation where acceleration is needed immediately after deceleration of the hybrid vehicle, the engagement of the engine clutch may be maintained instead of the disengagement of the engine clutch.

More specifically, during the HEV mode, when a driver switches the left or right turn signal lamp to change lanes, overtake other vehicles, and turn left or right in an intersection, a switch-on signal of the left or right turn signal lamp may be transmitted to the cluster via the CAN communication, and simultaneously, may also be transmitted to the controller 15 for the engagement and the disengagement of the engine clutch. Thus, the controller may recognize a situation where acceleration is needed immediately after deceleration.

Even though the disengagement condition of the engine clutch according to the deceleration of a vehicle is satisfied, the controller may recognize a situation where acceleration is needed, and simultaneously, may maintain the engagement state of the engine clutch.

Thus, the engagement state of the engine clutch may be maintained in a situation where the acceleration is needed immediately after deceleration of a hybrid vehicle. A gear-shifting time delay (about 1.1 seconds or more) can be prevented because a hybrid vehicle enters kickdown while the engine clutch is re-engaged upon acceleration after the disengagement of the engine clutch.

Also, the accelerating performance can be improved in a situation where acceleration is needed immediately after deceleration, and the fuel efficiency can be prevented from being reduced due to an excessive repetition of the engagement and disengagement of the engine clutch.

The present disclosure provides the following effects.

According to an embodiment of the present disclosure, when a hybrid vehicle confronts driving situations, such as, changing lanes, overtaking other vehicles, and turning left or right at an intersection, that need acceleration immediately after a deceleration of the hybrid vehicle in a state where an engine clutch is engaged, the engagement state of the engine clutch is maintained, thereby improving the operability and the accelerating performance of the hybrid vehicle. Also, the fuel efficiency can be improved by preventing a repetition of the engagement and disengagement of the engine clutch.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A device for controlling a clutch of a hybrid vehicle including controlling an engagement and a disengagement of an engine clutch installed between an engine and a motor, the device comprising:

an acceleration request sensor for sensing driving situations in which acceleration is needed immediately after deceleration of the hybrid vehicle in a state where the engine clutch is engaged; and a controller maintaining the engagement state of the engine clutch even though a disengagement condition of the engine clutch is satisfied when receiving a sensed signal of the acceleration request sensor.

2. The device of claim 1, wherein the acceleration request sensor uses switches of left and right turn signal lamps.

3. The device of claim 2, wherein a controller area network (CAN) signal in a case where a turn-on signal of the switch is transmitted to a cluster is also transmitted to the controller.

4. A method for controlling a clutch of a hybrid vehicle including performing an engagement and disengagement of an engine clutch installed between an engine and a motor, the method comprising:

sensing driving situations in which acceleration is needed immediately after deceleration of the hybrid vehicle in a state where the engine clutch is engaged; and maintaining the engagement state of the engine clutch even though a disengagement condition of the engine clutch is satisfied when the driving situation in which a need for acceleration is sensed.

5. The method of claim 4, wherein the sensing of the driving situations in which acceleration is needed comprises sensing a turn-on signal of a switch of a left or right turn signal lamp.

6. The method of claim 5, wherein the sensing of the driving situations in which acceleration is needed comprises sensing a signal when the turn-on signal of the switch of the left or right turn signal lamp is transmitted to a cluster.

* * * * *